US009756461B1

(12) United States Patent
Hu et al.

(10) Patent No.: US 9,756,461 B1
(45) Date of Patent: Sep. 5, 2017

(54) PRIVACY-PRESERVING LARGE-SCALE LOCATION MONITORING

(71) Applicant: Twinly Marketing Technologies Limited, Hong Kong (HK)

(72) Inventors: Haibo Hu, Hong Kong (HK); Zhuo Chen, Hong Kong (HK); Jielin Yu, Hong Kong (HK)

(73) Assignee: Twinly Marketing Technologies Limited, Hong Kong (HK)

( * ) Notice: Subject to any disclaimer, the term of this patent is extended or adjusted under 35 U.S.C. 154(b) by 0 days.

(21) Appl. No.: 15/186,478

(22) Filed: Jun. 19, 2016

(51) Int. Cl.
*H04W 24/00* (2009.01)
*H04W 4/02* (2009.01)
*H04W 8/00* (2009.01)
*H04W 60/00* (2009.01)

(52) U.S. Cl.
CPC .............. *H04W 4/02* (2013.01); *H04W 8/005* (2013.01); *H04W 60/00* (2013.01)

(58) Field of Classification Search
None
See application file for complete search history.

(56) References Cited

U.S. PATENT DOCUMENTS

2016/0088424 A1* 3/2016 Polo ...................... H04W 4/008
455/41.1

OTHER PUBLICATIONS

P. Aditya, V. Erdlyi, M. Lentz, E. Shi, P. Druschel, and B. Bhattacharjee, "Encore: Private, context-based communication for mobile social apps," Proceedings of ACM MobiSys 2014, Bretton Woods, NH, USA, 2014.

J. Bao, Y. Zheng, and M. F. Mokbel, "Location-based and preference-aware recommendation using sparse geo-social networking data," Proceedings of the 20th International Conference on Advances in Geographic Information Systems, pp. 199-208. ACM, 2012.

M. V. Barbera, A. Epasto, A. Mei, V. C. Perta, and J. Stefa, "Signals from the crowd: uncovering social relationships through smartphone probes," Proceedings of the 2013 conference on Internet measurement conference (IMC '13), New York, NY, USA, pp. 265-276, 2013.

B. L. V. A. Bergamini, L., "Privacy-preserving environment monitoring in networks of mobile devices," Proceedings of the IFIP TC 6th international conference on networking, pp. 179-191.

(Continued)

*Primary Examiner* — Idowu O Osifade
(74) *Attorney, Agent, or Firm* — Spruson & Ferguson (Hong Kong) Limited

(57) ABSTRACT

A privacy-preserving location monitoring system is provided, comprising monitoring hosts and a server. Immense resource requirement in large-scale location monitoring is lessened by allowing peripheral devices of users to bond to only one host. A peripheral device's one or more identity resolving keys (IRKs) retrieved by the host are sent to the server so as to register the IRKs to the server. The server propagates the IRKs to all other hosts. Furthermore, each host only stores the IRKs of peripheral devices frequently visiting the host. An incoming IRK not known by the host is sent to the server for resolving an identity of a peripheral device sending this IRK. The system is implementable in Bluetooth Low Energy (BLE) technology. Based on privacy features of BLU, different privacy protection mechanisms, including opt-in/out, k-anonymity and granularity-based anonymity, are provided.

18 Claims, 11 Drawing Sheets

(56) References Cited

OTHER PUBLICATIONS

N. Davies, A. Dey, J. Hightower, and E. de Lara, "Location based services," IEEE Pervasive Computing, 9(1):0011-12, 2010.

Y.-A. de Montjoye, C. A. Hidalgo, M. Verleysen, and V. D. Blondel, "Unique in the crowd: The privacy bounds of human mobility," Scientific Reports, 3(1376), Mar. 2013.

M. R. Ebling and R. C'aceres, "Gaming and augmented reality come to location-based services," IEEE Pervasive Computing, (1):5-6, 2010.

N. Gonalves, R. Jos, and C. Baquero, "Privacy preserving gate counting with collaborative bluetooth scanners," Proceedings of on the Move to Meaningful Internet Systems: OTM 2011 Workshops, pp. 534-543, 2011.

C. Jiang and P. Steenkiste, "A hybrid location model with a computable location identifier for ubiquitous computing," Proceedings of UbiComp '02, the 4th international conference on Ubiquitous Computing, pp. 246-263, 2002.

M. Kamp, C. Kopp, M. Mock, M. Boley, and M. May, "Privacy-preserving mobility monitoring using sketches of stationary sensor readings," Proceedings of ECML/PKDD 2013, Prague, Czech Republic, 2013.

D. Li and D. L. Lee, "A topology-based semantic location model for indoor applications," Proceedings of the 16th ACM SIGSPATIAL international conference on Advances in geographic information systems, Irvine, California, 2008.

E. O'Neill, V. Kostakos, T. Kindberg, A. Schiek, A. Penn, D. Fraser, and T. Jones, "Instrumenting the city: Developing methods for observing and understanding the digital cityscape," 4206:315-332, 2006.

H. Zhang, Z. Yan, J. Yang, E. M. Tapia, and D. J. Crandall. "mfingerprint: Privacy-preserving user modeling with multimodal mobile device footprints," Proceedings of ECML/PKDD 2013, Prague, Czech Republic, 2013.

\* cited by examiner

PRIVACY-PRESERVING LARGE-SCALE LOCATION MONITORING

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention generally relates to a method and a system for monitoring locations of peripheral devices carried by users where the peripheral devices send out advertising signals for facilitating user-location monitoring by a location-monitoring system. In particular, the present invention relates to such method and system with provisions for enhancing user privacy.

BACKGROUND

List of References

There follows a list of references that are occasionally cited in the specification. Each of the disclosures of these references is incorporated by reference herein in its entirety.

[1] P. Aditya, V. Erdlyi, M. Lentz, E. Shi, P. Druschel, and B. Bhattacharjee, "Encore: Private, context-based communication for mobile social apps," *Proceedings of ACM MobiSys* 2014, Bretton Woods, N.H., USA, 2014.

[2] J. Bao, Y. Zheng, and M. F. Mokbel, "Location-based and preference-aware recommendation using sparse geo-social networking data," *Proceedings of the 20th International Conference on Advances in Geographic Information Systems*, pages 199-208. ACM, 2012.

[3] M. V. Barbera, A. Epasto, A. Mei, V. C. Perta, and J. Stefa, "Signals from the crowd: uncovering social relationships through smartphone probes," *Proceedings of the 2013 conference on Internet measurement conference (IMC '13)*, New York, N.Y., USA, pages 265-276, 2013.

[4] B. L. V. A. Bergamini, L., "Privacy-preserving environment monitoring in networks of mobile devices," *Proceedings of the IFIP TC 6th international conference on networking*, pages 179-191.

[5] N. Davies, A. Dey, J. Hightower, and E. de Lara, "Location based services," *IEEE Pervasive Computing*, 9(1):0011-12, 2010.

[6] Y.-A. de Montjoye, C. A. Hidalgo, M. Verleysen, and V. D. Blondel, "Unique in the crowd: The privacy bounds of human mobility," *Scientific Reports*, 3(1376), March 2013.

[7] M. R. Ebling and R. C'aceres, "Gaming and augmented reality come to location-based services," *IEEE Pervasive Computing*, (1):5-6, 2010.

[8] N. Gonalves, R. Jos, and C. Baquero, "Privacy preserving gate counting with collaborative bluetooth scanners," *Proceedings of On the Move to Meaningful Internet Systems: OTM 2011 Workshops*, pages 534-543, 2011.

[9] C. Jiang and P. Steenkiste, "A hybrid location model with a computable location identifier for ubiquitous computing," *Proceedings of UbiComp '02, the 4th international conference on Ubiquitous Computing*, pages 246-263, 2002.

[10] M. Kamp, C. Kopp, M. Mock, M. Boley, and M. May, "Privacy-preserving mobility monitoring using sketches of stationary sensor readings," *Proceedings of ECML/PKDD* 2013, Prague, Czech Republic, 2013.

[11] D. Li and D. L. Lee, "A topology-based semantic location model for indoor applications," *Proceedings of the $16^{th}$ ACM SIGSPATIAL international conference on Advances in geographic information systems*, Irvine, Calif., 2008.

[12] E. O'Neill, V. Kostakos, T. Kindberg, A. Schiek, A. Penn, D. Fraser, and T. Jones, "Instrumenting the city: Developing methods for observing and understanding the digital cityscape," 4206:315-332, 2006.

[13] H. Zhang, Z. Yan, J. Yang, E. M. Tapia, and D. J. Crandall. "mfingerprint: Privacy-preserving user modeling with multimodal mobile device footprints," *Proceedings of ECML/PKDD* 2013, Prague, Czech Republic, 2013.

DESCRIPTION OF RELATED ART

With the advent of ubiquitous and wearable computing, more and more people carry networking-connected devices, such as smartphones, tablets, and smart watches, on a daily basis. These devices are interconnected via short range radios such as Wi-Fi, Bluetooth (especially its low energy variant), or active RFID. The emergence of such devices has flourished the application of location monitoring in various domains, including emergency planning, marketing, and event surveillance [12], [2], [7]. The following are some use cases.

Employers such as large corporations or universities can manage all staff or students efficiently and in real time. For example, in case of a fire outbreak in a building, the firemen can learn the distribution of users in this building and set out the evacuation and rescue plan accordingly.

A shopping mall owner can learn the customer flows and distributions inside the mall. Therefore, they can take measures to boost low-flow areas, such as launching some marketing campaigns or physically broaden the passages.

Government authority or law enforcement can monitor some important public spaces, such as airports and train stations. By doing so, they can detect and respond to riots or disturbances as soon as they occur.

However, such location monitoring imposes severe privacy threats to users. In essence, the infrastructure or system can learn the location of any user at any time. As such, location information can disclose very sensitive user information, such as medical condition, financial status, or political/religious affiliation [5], [6]. A privacy-preserving monitoring infrastructure needs to be devised for any serious monitoring applications.

Furthermore, large-scale location monitoring, which involves monitoring a large number of users, poses a challenge to a location-monitoring system in that the resource requirement in computation and other aspects is immense. Desirably, the system supporting large-scale location monitoring uses simple procedure for reducing the resource requirement.

Regarding spatial and mobility monitoring, there have been some works in mobile and ubiquitous computing that monitor, count, or identify mobile users based on wireless data and communication.

In [8], Goncalves et al. point out that Bluetooth can be used as an infrastructure for massive sensing scenarios. They have proposed a Bluetooth scanning technique for gate counting scenarios, and the objective is to provide an accurate count for the number of unique devices sighted. The proposed technique is a hybrid analysis of several stochastic counting techniques that have certain privacy guarantees.

In [13], Zhang et al. have proposed to use multimodal mobile sensor and log data to uniquely depict users. They have designed a privacy-preserving framework called "mFingerprint" that computes privacy-preserving statistical features from raw sensitive information of the mobile device, such as the exact location, WiFi access points, or apps installed. Their system have been run on 22 users' mobile phone data collected over 2 months, and achieved 81% identification accuracy.

In [10], Kamp et al. have identified the problem of privacy problem in Bluetooth scanners for tracking the number of distinct persons, because they store the MAC address of a device that can in principle be linked to a single person. They have pointed out that unique hashing of the address only partially solves the problem because such a pseudonym is still vulnerable to various linking attacks. Therefore, they have proposed a solution that uses an extension of linear counting sketches. The idea is to map several individuals to the same position in a sketch, while at the same time the inaccuracies introduced by this overloading are compensated by using several independent sketches.

In [4], Bergamini et al. have presented a privacy-preserving solution to estimate the number of distinct mobile users in a given area. In their envisioned scenario, users periodically transmit a sketch (i.e. a summary) of the users they met in the past. This sketch is applied with duplicate-insensitive hash functions, so they also provide privacy to certain extent.

In [1], Aditya et al. have presented EnCore, a mobile platform that builds on secure encounters between pairs of devices as a foundation for privacy-preserving communication. An encounter occurs whenever two devices are within Bluetooth radio range of each other, and generates a unique encounter ID and associated shared key. The system has been deployed in a testbed with 35 users.

In [3], Barbera et al. have exploited mobile devices' automatic WiFi connection mechanism, which recurrently broadcasts automatic connectivity requests to known access points such as "Home WiFi", and "Campus WiFi". By collecting around 11M probes sent by more than 160K different devices in a 3-month long campaign, Barbera et al. have revealed a simple methodology to build the underlying social graph of the smartphone users, by comparing their lists of preferred Wi-Fi probes.

Despite all these efforts, there is still a need in the art for a technique in privacy-preserving large-scale location monitoring.

SUMMARY OF THE INVENTION

An aspect of the present invention IS to provide a method for monitoring locations of a plurality of peripheral devices by a location-monitoring system. An individual peripheral device is configured to broadcast an advertising signal containing a broadcasting address indicative to an identity resolving key (IRK). The IRK is a key agreed between a peripheral device and a monitoring host. The IRK represents a status of the individual peripheral device. The system comprises a plurality of monitoring hosts and a server communicable with the monitoring hosts. Each of the monitoring hosts is configured to scan the advertising signal broadcast from the individual peripheral device.

In the method, a bond between the individual peripheral device and an interfacing host is set up when the individual peripheral device registers to the system, where the interfacing host is selected from the monitoring hosts. The interfacing host retrieves one or more pre-selected IRKs of the individual peripheral device. The interfacing host also sends the one or more pre-selected IRKs to the server, so as to register the one or more pre-selected IRKs of the individual peripheral device to the server. The server propagates the one or more pre-selected IRKs received from the interfacing host to all the monitoring hosts other than the interfacing host.

In one option, the individual peripheral device is bonded to the interfacing host only without bonding to any other of the monitoring hosts.

In another option, an additional bond between the individual peripheral device and an additional interfacing host is also set up when the individual peripheral device registers to the system. The additional interfacing host is selected from the monitoring hosts and is different from the interfacing host. The additional interfacing host retrieves an additional pre-selected IRK of the individual peripheral device, but discards this additional pre-selected IRK without sending it to the server or retaining it in the additional interfacing host. The individual peripheral device is configured as follows. When the individual peripheral device allows the location thereof to be detected by the system, the IRK in the advertising signal broadcast by the individual peripheral device is selected from the one or more pre-selected IRKs. Otherwise, the IRK in the advertising signal broadcast by the individual peripheral device is the additional pre-selected IRK.

In yet another option, the one or more pre-selected IRKs include a device-specific IRK and a group IRK. The device-specific IRK is uniquely used by the individual peripheral device. The group IRK is shared by a group of peripheral devices including the aforesaid individual peripheral device. Furthermore, the individual peripheral device is configured as follows. When the individual peripheral device allows the location and an identity thereof to be detected by the system, the IRK in the advertising signal broadcast by the individual peripheral device is the device-specific IRK. When the individual peripheral device allows the location thereof to be detected by the system but disallows the identity of the individual peripheral device to be revealed to the system, the IRK in the advertising signal broadcast by the individual peripheral device is the group IRK.

In a further option, an individual monitoring host has a host-specific number equal to a location-area granularity level assigned to a location area where the individual monitoring host resides. Each pre-selected IRK of the individual peripheral device is associated with a granularity level threshold. When an incoming IRK obtained by the individual monitoring host during the scanning of the advertising signal matches one pre-selected IRK having a first granularity level threshold, and when the host-specific number of the individual monitoring host is below the first granularity level threshold, the individual monitoring host discards the incoming IRK without identifying the location of a particular peripheral device that sent this incoming IRK.

In the method, preferably an individual monitoring host is arranged to store only a subset of IRKs obtained during registering the peripheral devices to the system. The IRKs in the subset correspond to the peripheral devices that frequently visit the individual monitoring host. When an incoming IRK obtained by the individual monitoring host during the scanning of the advertising signal does not match with any IRK stored in the individual monitoring host, the individual monitoring host forwards the incoming IRK to the server for resolving an identity of a particular peripheral device that sent out the incoming IRK.

There are some options in forwarding the incoming IRK to the server. In one option, the individual monitoring host first sends the incoming IRK to another monitoring host. The aforesaid another monitoring host then relays the incoming IRK to the server without disclosing to the server that the incoming IRK was obtained by the individual monitoring host. In another option, the individual monitoring host is configured to: accumulate a plurality of incoming IRKs that require the server to resolve the identities of the peripheral devices sending these incoming IRKs to thereby form a batch; and send the batch to the server instead of individually sending each incoming IRK upon receipt thereof. Preferably, the individual monitoring host shuffles the accumulated incoming IRKs in their order before forming the batch. The individual monitoring host may further incorporate one or more dummy IRKs generated by the individual monitoring host into the batch for avoiding the server to have full knowledge on the incoming IRKs obtained by the individual monitoring host.

Other aspects of the present invention are disclosed as illustrated by the embodiments hereinafter.

DETAILED DESCRIPTION

Figure 1:
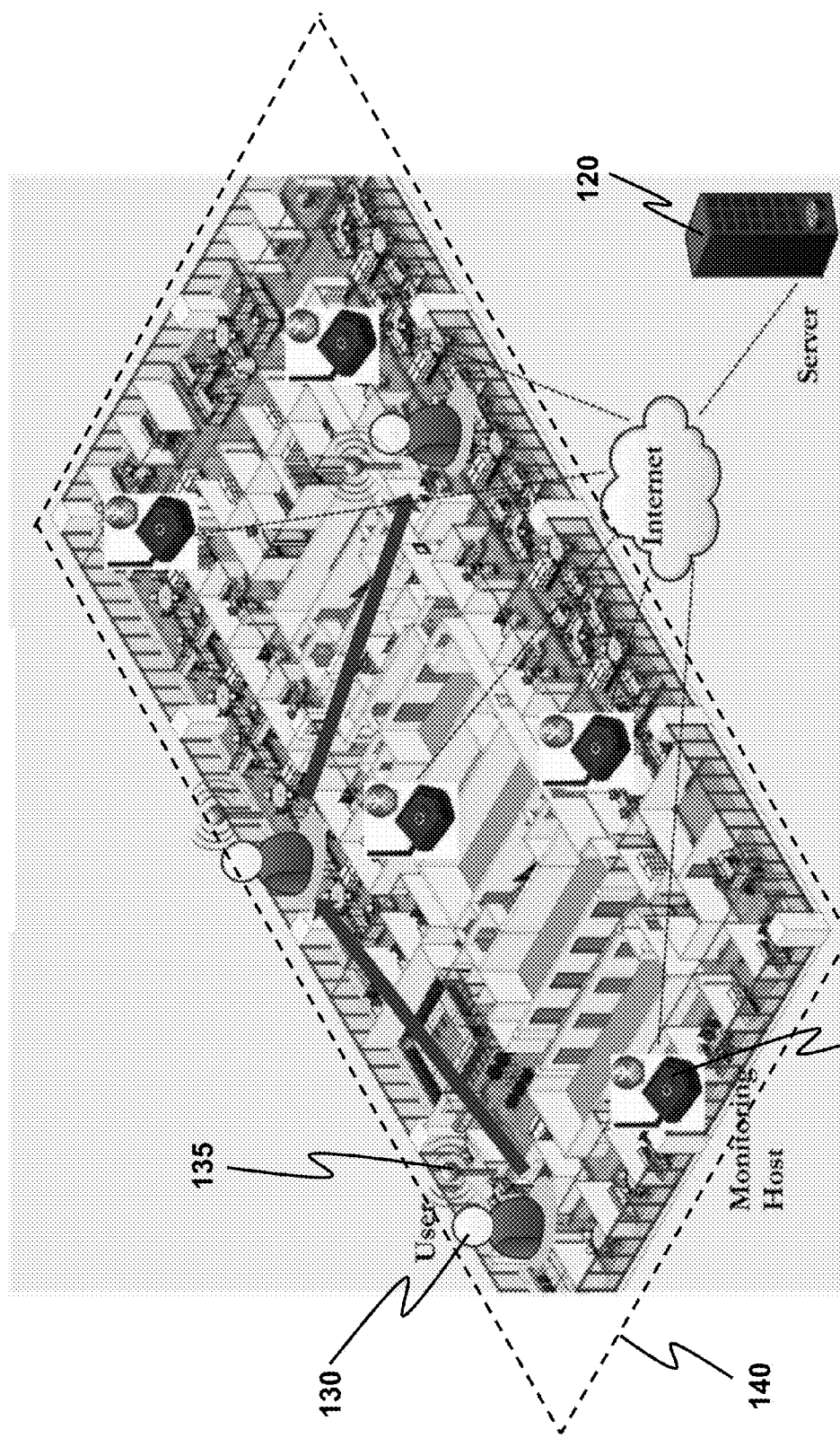
FIG. 1 exemplarily depicts a model of a location-monitoring system as disclosed herein, where the system comprises monitoring hosts and a central server.

The following definitions are used herein in the specification and the appended claims. "A user" means a person, or an object in general, that is subjected to location monitoring by a location-monitoring system. "A peripheral device" is a portable device carried by a user where the peripheral device broadcasts one or more advertising signals to a location-monitoring system for facilitating identification of the user's location. An example of the peripheral device is a BLE-enabled smartphone where BLE stands for Bluetooth Low Energy. "A monitoring host," "a host" and "a host device" are used interchangeably to mean a device for scanning one or more advertising signals broadcast from any nearby peripheral device. "A central server" or "a server" in a location-monitoring system is a computing server configured to work with one or more monitoring hosts for monitoring locations of one or more users. "A monitoring area" means an area within which a user's location is tracked by a location-monitoring system. The monitoring area is not limited to a two-dimensional area, and may be composed of a plurality of separate small areas collectively forming a three-dimensional space. An example of the latter situation can be found in an indoor environment of a multi-storey building, where the monitoring area comprises a number of floors.

An exemplary embodiment of the present invention is a privacy-preserving location monitoring system based on existing privacy features of Bluetooth Low Energy (BLE). Specifically, BLE supports privacy by enabling an advertiser to replace its public Bluetooth address with temporary, periodically changing addresses that can only be recognized by authorized peers. Based on this feature, we have extended it to support a variety of privacy protection mechanism, including opt-in/out, k-anonymity and granularity-based anonymity. These features have been wrapped in our customized Generic Attribute Profile—(GATT-)based profile called "Track Me Profile" (TMP). Furthermore, the immense resource requirement in large-scale location monitoring is lessened by using the "bond-once, scan everywhere" paradigm and the "remote address resolving" technique.

A. System Objective and Model

The goal of the system is to monitor user locations with certain privacy guarantee. The location monitoring is based on the BLE signal from peripheral devices they carry, such as smart watches, bracelets. While not in a connection, these devices periodically broadcast connectable advertising packets. With the deployment of scanners over the space, the addresses of these packets are recorded in the system and used to identify users and their locations (see Section A.2 for details). The data are gathered to measure how an individual spends time at different locations, and how many people stay at a certain location at a specific moment, allowing various applications such as personalized activity monitoring, pedestrian flow analysis, or emergency evacuation planning.

On the other hand, user privacy is guaranteed in the system. Specifically, a user's location is traceable but the user has full control over the location disclosure through the following features.

1) Opt-in Opt-out. A user can specify, either in an ad-hoc manner or as scheduled, whether he/she wants to "opt-in" or "opt-out" for tracking. By "opt-in," it is meant that the user allows the system to track his or her location. The terminology "opt-out" stands for an opposite scenario that the user does not.

2) Privacy Metric Support. A user can quantify the location disclosure by the system and therefore set a privacy threshold. In location privacy literature, there are two predominant privacy metrics:

a) k-anonymity: The user is not uniquely identified. Instead, the system cannot differentiate the user from other k–1 users.

b) granularity: The user's disclosed location is limited to a certain granularity level, for example, "Tower 18", "Second Floor, Tower 18", or "Zone C, Second Floor, Tower 18"

To implement these features, BLE Privacy 1.1 and above is adopted. That is, the device changes their resolvable private addresses from time to time to avoid being traced. The design principle of the system is Bluetooth-stack independent. That is, the whole system does not need to modify any BLE protocols—the system just works as long as the devices are BLE compatible and privacy feature enabled.

A.1 System Model and Security Goal

FIG. 1 exemplarily illustrates the system under consideration, which comprises monitoring hosts 110 and a central server 120. The monitoring hosts 110 are distributed over a monitoring area 140. The monitoring area 140 is an area for one or more users 130 to stay in, where the users 130 broadcast advertising signals through their peripheral devices 135. The core part of the system is the monitoring hosts 110, which scan BLE advertising packets from nearby peripheral devices. Each of the monitoring hosts 110 then sends all collected data to the central server 120 by, for example, Ethernet or 3G/GPRS connectivity. As for the security goal, it is assumed that the central server 120 can be trusted and therefore the main privacy objective is to prevent the monitoring hosts 110 from learning the locations of the users without permission as specified in the above-mentioned privacy features. Another system with a stronger security goal is provided in Section C.6.

A.2. Location Area Model

To support various location monitoring applications and granularity-based privacy metric, the design principle of a hierarchical location model in [9] and [11] is followed, and the following model is obtained.

Definition 3.1: An indoor space hierarchy consists of sets of location area and associated exits, where an exit denotes an entrance/exit point of a location area through which the user enters or leaves the area. Formally, an entry of a location area is denoted by LA={pLA, gran, description, exits} where: pLA is the parent location area; exits= {$exit_1, \ldots, exit_i$} is a non-empty set of associated exits; and gran is the granularity level and is set to the depth of the location area in the hierarchy, where the root location has gran=0.

Figure 2:
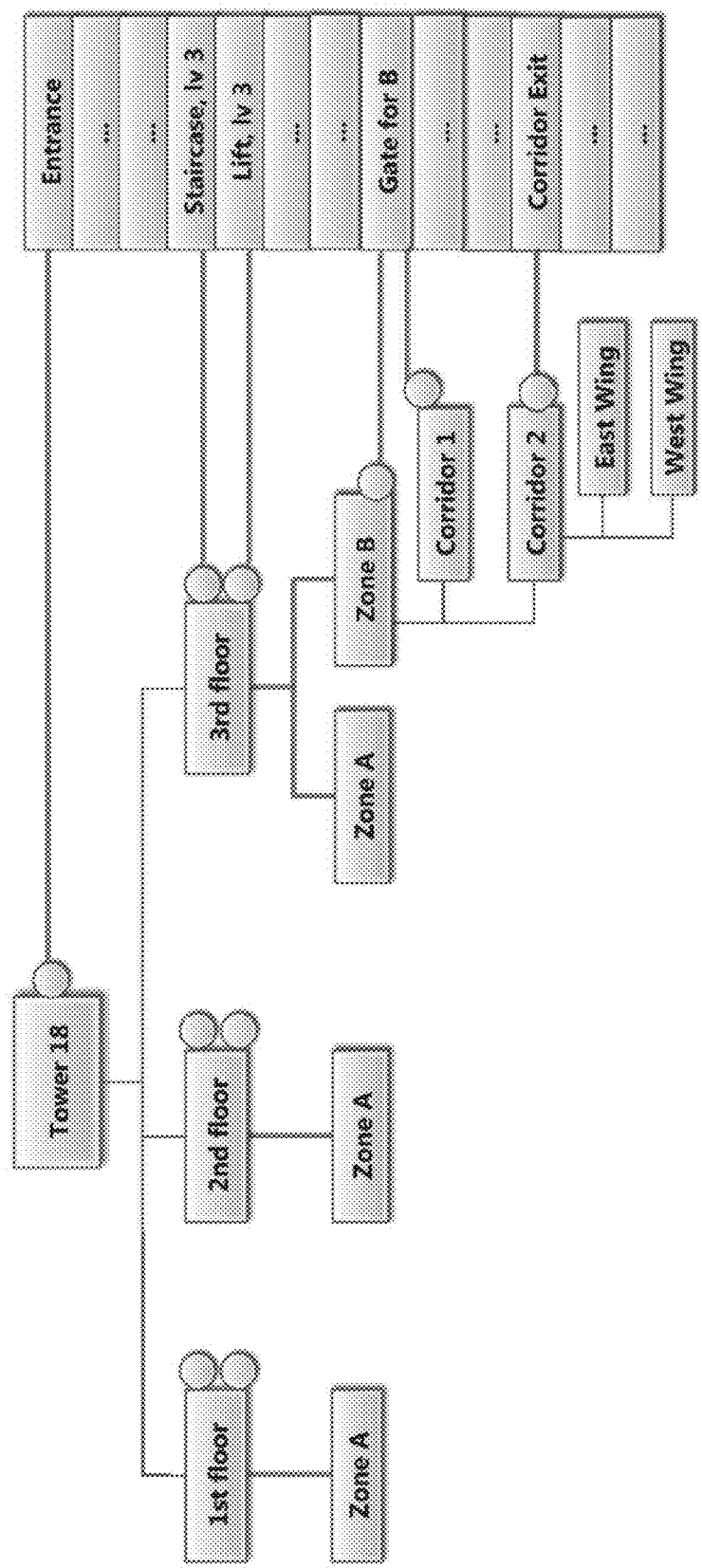
FIG. 2 depicts a hierarchical location area model for a typical office building.

FIG. 2 illustrates the location area hierarchy in a typical office building such as the one shown in FIG. 1. Note that an exit can serve more-than-one location areas, as long as these location areas form a direct path in the tree. For example, "Gate for B" is the exit for both "Corridor 1" and its parent "Zone B".

B. Design of Location Monitoring

B.1 Monitoring Hosts

A monitoring host acts as a scanner role in the BLE Link Layer, which scans Bluetooth radios of nearby devices. As a scanner, the host does not connect to BLE devices and thus is transparent to them. The monitoring host collects the addresses of these devices and sends them to the server together with the timestamps, through, for example, Ethernet or WiFi connection. One practical example of the monitoring host, which has also been used in experiments conducted by the Inventors, is a WiFi router with a USB interface that connects to a Bluetooth 4.0 USB adapter. We deploy a monitoring host for each exit in our location model.

B.2 Detailed Procedures

Figure 3:
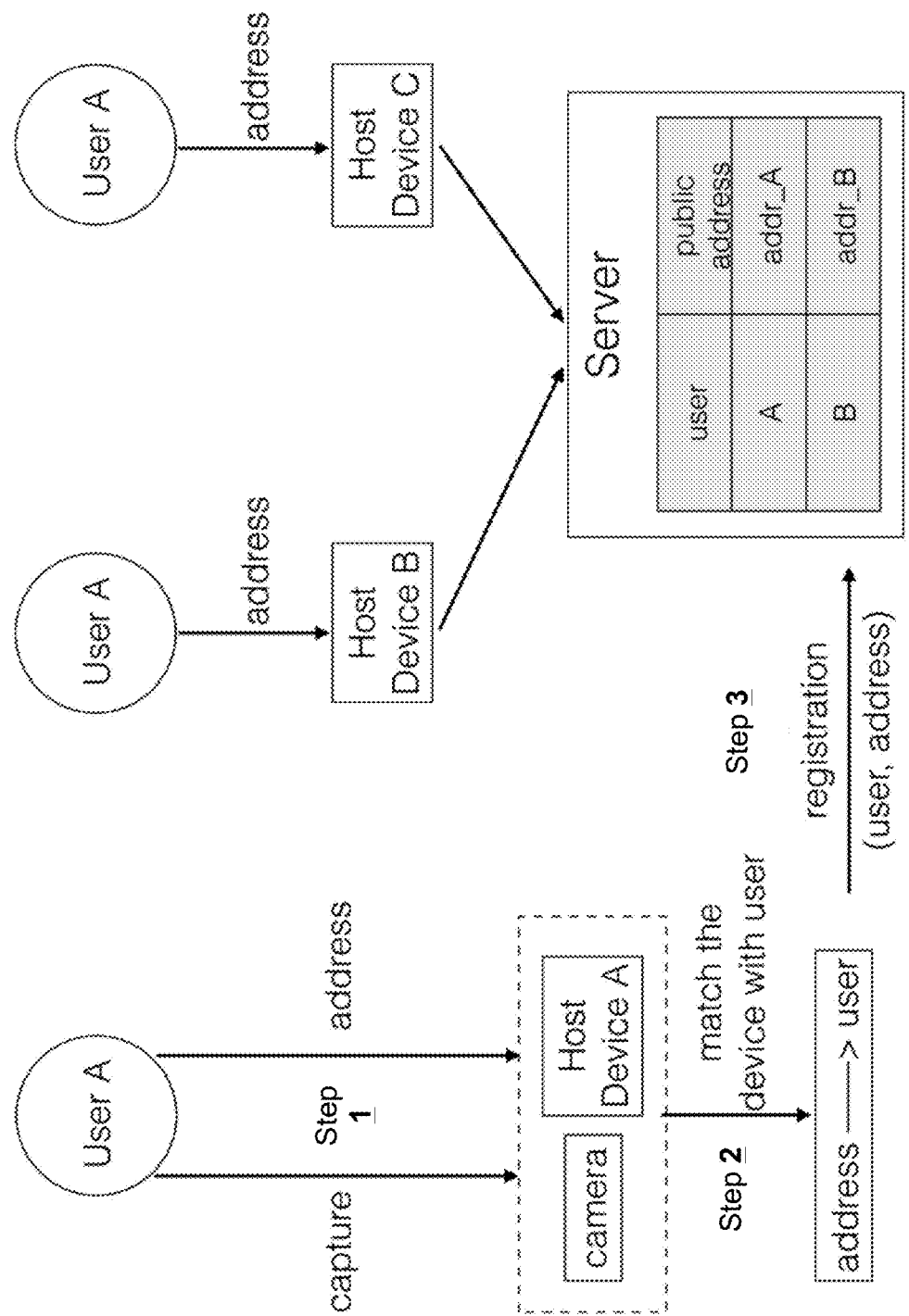
FIG. 3 exemplarily illustrates a detailed procedure of location monitoring used in the system.

FIG. 3 exemplarily illustrates the detailed procedure of location monitoring used in the system disclosed herein. At first, set up an information collection module (being a hardware unit) that contains a camera for taking photos, and a host device for scanning Bluetooth devices. When a user passes by a collection area installed with the information collection module, the module tries to capture the user's face and scan the broadcasting Bluetooth device carried by the user at the same time. In certain situations, the user identity can be matched with his/her Bluetooth device's address. Steps 1-3 in FIG. 3 are regarded as a registration for the location monitoring system. Users use this information collection module to register themselves to the system, and then the users who carry Bluetooth-enabled devices will be scanned by any other host devices in the system. Therefore, the system can track the users' locations over the monitoring area.

C. Design of Privacy Features

The system described in Section B.2 could be exploited for malicious monitoring without privacy features. In this section, we describe implementation of privacy features of the disclosed monitoring system on top of the BLE privacy features. We first show the implementation of baseline BLE privacy features, i.e. Identity Resolving Key (IRK) and resolvable address, over a large monitoring population in wide area. Then we elaborate implementation details of the three privacy features, namely, opt-in/opt-out, k-anonymity, and granularity-based privacy metrics.

C.1 Baseline Privacy Features

First of all, the detailed procedure of implementing the baseline privacy feature introduced in the BLE specification is discussed as follows. In a privacy protection tracking system, a monitoring host has two main tasks. The first is to carry out registration by bonding itself with a peripheral device. The bonding enables the retrieval of the peripheral device's IRK, which is then pushed to the server. The particular use of the IRK as indicated in the BLE specification is for device identity and privacy. The second task is to keep scanning nearby BLE devices and resolve their identity addresses with all saved IRKs.

Figure 4:
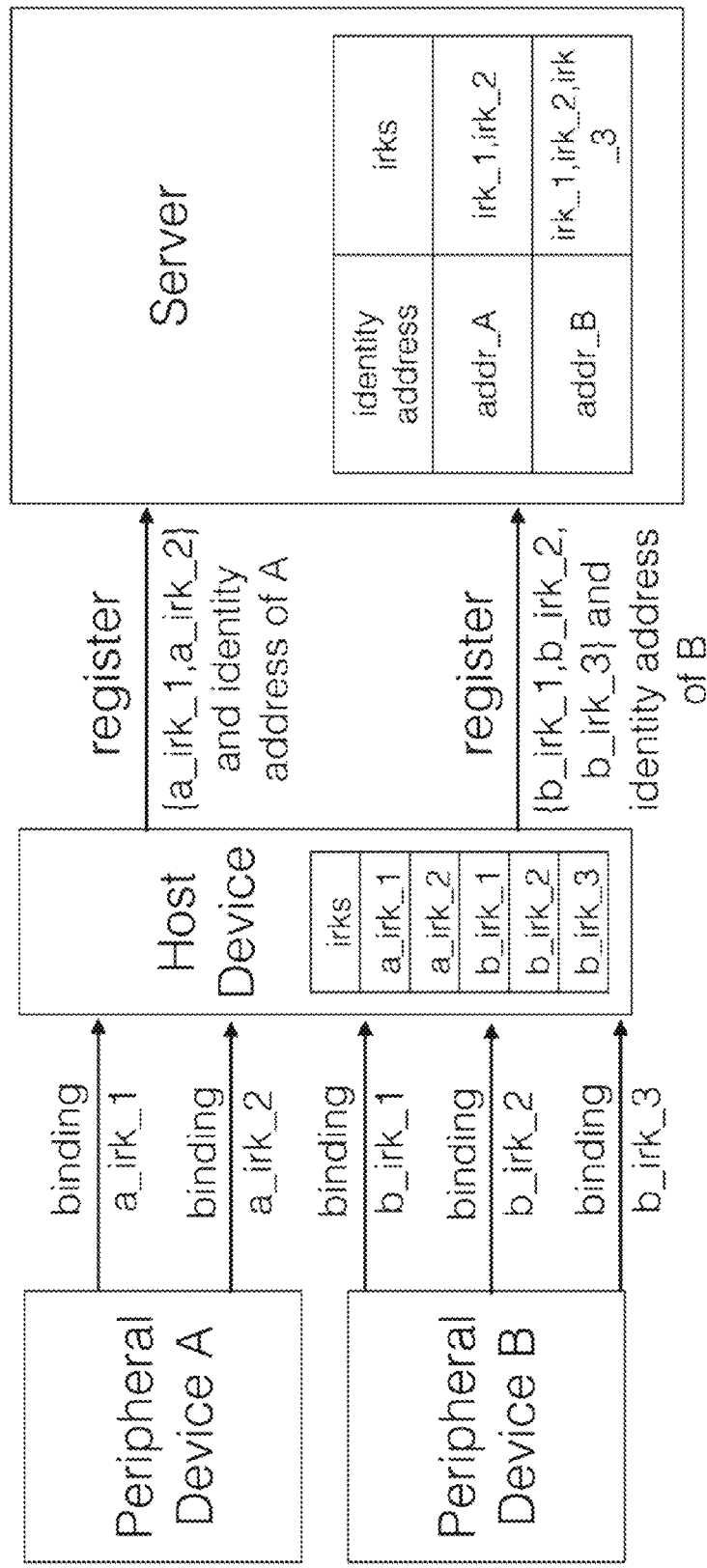
FIG. 4 depicts one example of a registration procedure for illustrating the disclosed system.
Figure 5:
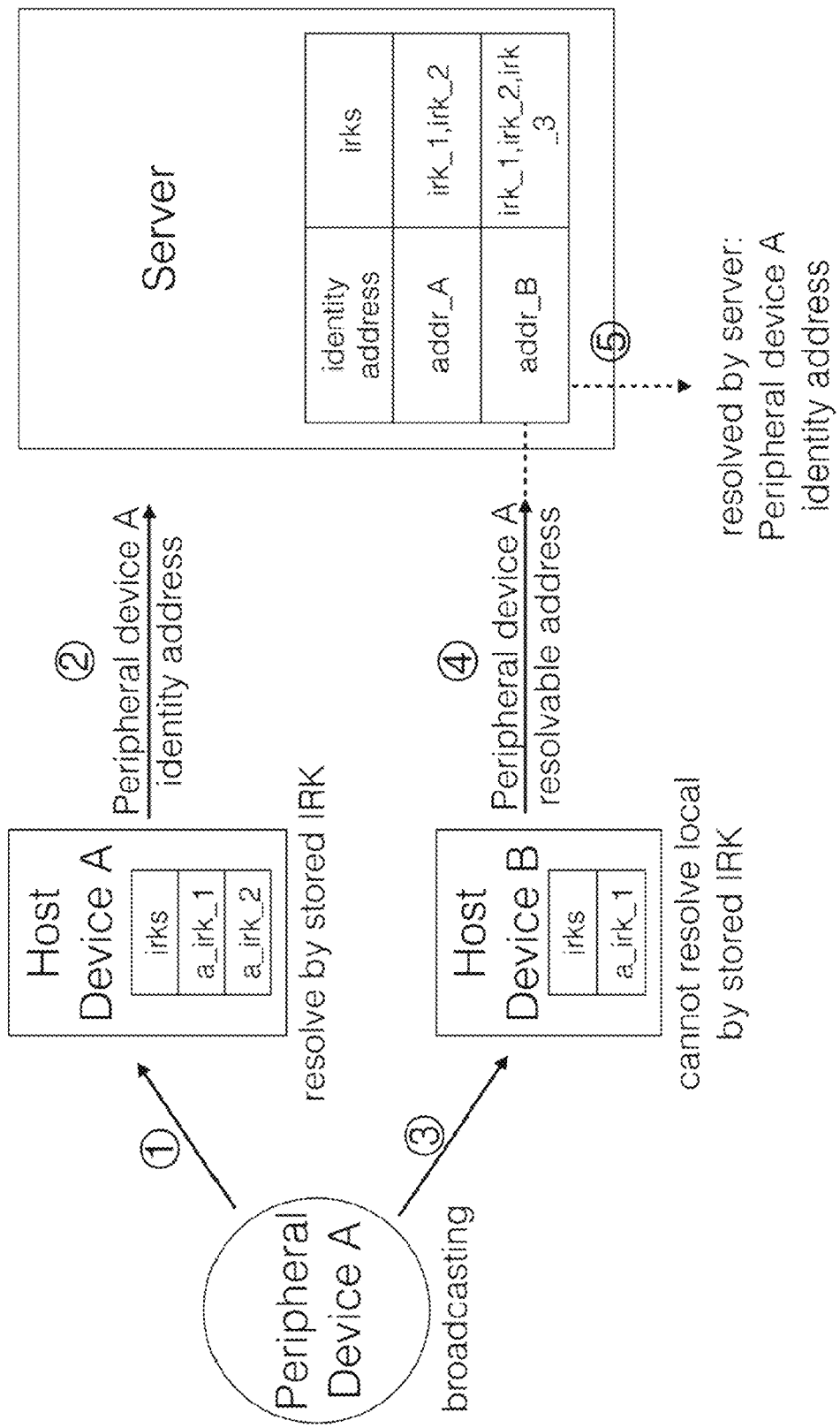
FIG. 5 depicts one example of a monitoring procedure for illustrating the disclosed system.

In implementation, the host device always works in the Generic Access Profile (GAP) layer except for the bonding process. To ensure our host specification can be applied to most of BLE devices, we model the hosts with a 10-slot least recently used (LRU) stack to store all incoming IRKs. FIG. 4 illustrates how the peripheral devices register to the system. Each peripheral device can register multiple IRKs to the server, different IRKs representing different statuses of the device owner (i.e. the user). The first step of the registration is to setup a bond between the peripheral device and host device, and IRKs will be exchanged between the peripheral device and the host device if the bonding is successfully completed. Meanwhile, the host device stores the peripheral device's IRK to the LRU stack. The second step is that the host device uploads the identity address and the corresponding IRKs of the peripheral device to the server. At the server side, the uploaded data is saved in a database properly. FIG. 5 shows the procedures of monitoring. When host device scans a broadcasting address, the host device first tries to resolve the address by checking with local IRKs from the LRU stack. If the address can be resolved successfully, the identity address of Peripheral Device A is then sent to the server. As shown in the fourth step in FIG. 5, Host Device B pushes the scanned address to the server automatically if this host device cannot resolve the scanned address with existing IRKs. The server then tries to resolve the received address by iterating the IRK list. In the experiments conducted by the Inventors, the aforementioned implementation was carried out on BLE CC2540 Dongle, which was connected with a router by the UART protocol via USB.

C.1.1 Implementation of Resolvable Private Address Resolution with IRKs

Figure 10:
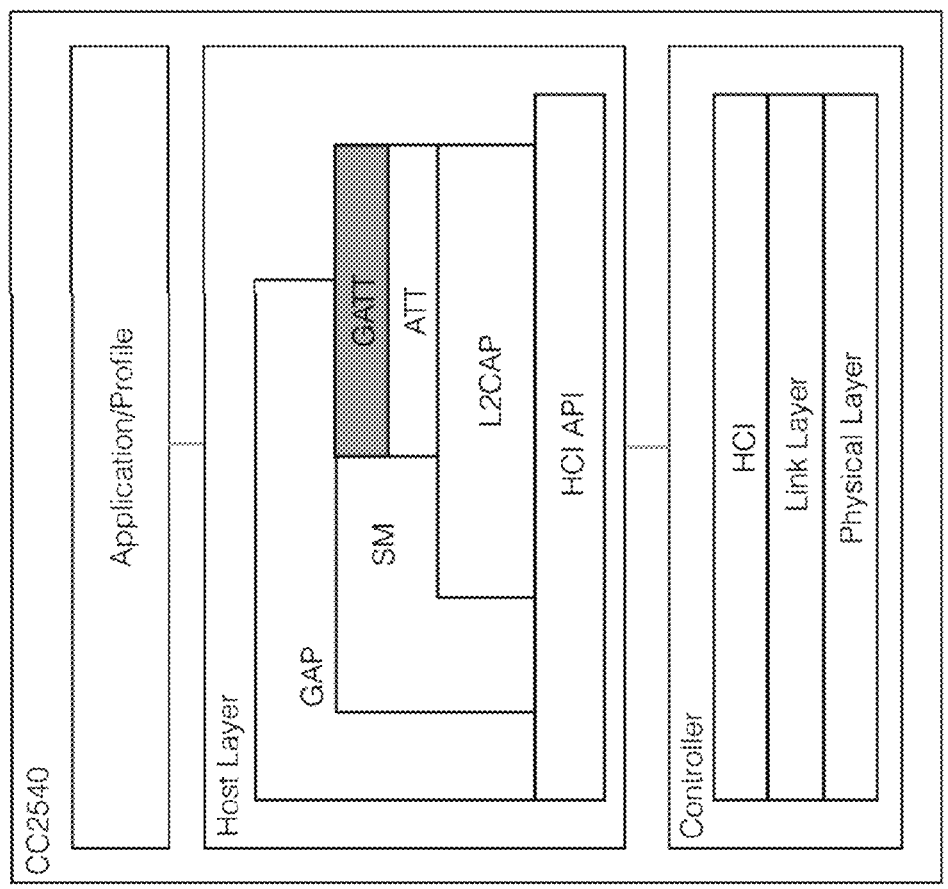
FIG. 10 illustrates a BLE stack structure of CC2540.

When the privacy feature is enabled by the firmware of monitoring hosts or peripheral devices, the peripheral devices then broadcast with resolvable private address (rpAddress). In this section, implementation details of the generation and resolution of rpAddress with IRKs are explained. FIG. 10 illustrates the BLE stack structure of CC2540 [9]. The Security Manager (SM) module in the host layer provides a security function to generate and resolve the rpAddress. However, this function is an AES hardware encryption, meaning that its implementation method is invisible to a system developer and can only be invoked in Bluetooth dongle. In the privacy-protection tracking system as disclosed herein, the server side must have resolution capability to identify an individual device with its rpAddress.

The detailed procedures of the encryption are illustrated in Algorithm 1 as follows.
Algorithm 1: Pseduo Code for Cipher
1: Cipher(byte in [4*Nb], byte out[4*Nb], word w[Nb*(Nr+1)])
2: byte state[4, Nb]
3: state=in
4: AddRoundKey(state, w[0, Nb−1])
5: for round=1 step 1 to Nr−1 do
6: SubBytes(state)
7: ShiftRows(state)
8: MixColums(state)
9: AddRoundKey(state, w[round*Nb], (round+1)*Nb−1)
10: end for
11: SubBytes(state)
12: ShiftRows(state)
13: AddRoundKey(state, w[Nr*Nb, (Nr+1)*Nb−1])
14: out=state Algorithm 1 adopts the AES cryptosystem, where the length of the input block, the output block and the state is 128 bits. This is represented by Nb=4, which reflects the number of 32-bit words. The number of rounds is represented by Nr, which to be performed during the execution of the algorithm is dependent on the key size. Since hardware encryption uses AES-128, we set Nr=10. The AES algorithm uses a round function that is composed of four different byte-oriented transformations as follows.
 1) SubBytes( ) byte substitution using a substitution table (S-box).
 2) ShiftRows( ) shifting rows of the State array by different offsets.
 3) MixColumns( ) mixing the data within each column of the State array.
 4) AddRoundKey( ) a Round Key is added to the State by a simple bitwise XOR operation. Each Round Key consists of Nb words from the key schedule illustrated in Algorithm 2 below to generate a key schedule.
Algorithm 2: Pseudo Code for Key Expansion
1: KeyExpansion(byte key[4*Nk], word w[Nb*(Nr+1)], Nk)
2: word temp
3: i=0
4: while (i<Nk) do
5: w[i]=word(key[4*i], key[4*i+1], key[4*i+2], key[4*i+3])
6: i=i+1
7: end while
8: i=Nk
9: while (i<Nb*(Nr+1)) do
10: temp=w[i−1]
11: if (i mod Nk=0) then
12: temp=SubWord(RotWord(temp)) xor Rcon[i/Nk]
13: else if (Nk>6 and i mod Nk=4) then
14: temp=SubWord(temp)
15: end if
16: w[i]=w[i−Nk] xor temp
17: i=i+1
18: end while When the server tries to identity a resolvable private address, the address is divided into a 24-bit random part (prand) and a 24-bit hash part (hash). The least significant octet of the rpAddress becomes the least significant octet of hash and the most significant octet of rpAddress becomes the most significant octet of prand. A localHash value is then generated using the random address hash function ah as defined in the Bluetooth protocols. The localHash value is then compared with the hash value extracted from the received address. If the localHash value matches the extracted hash value, then the identity of the peripheral device is resolved. Otherwise, the server repeats the above-described procedure for each IRK stored in the database to determine if the received resolvable private address is associated with a stored IRK.

C.2 Baseline Privacy over Large Population

Figure 6:
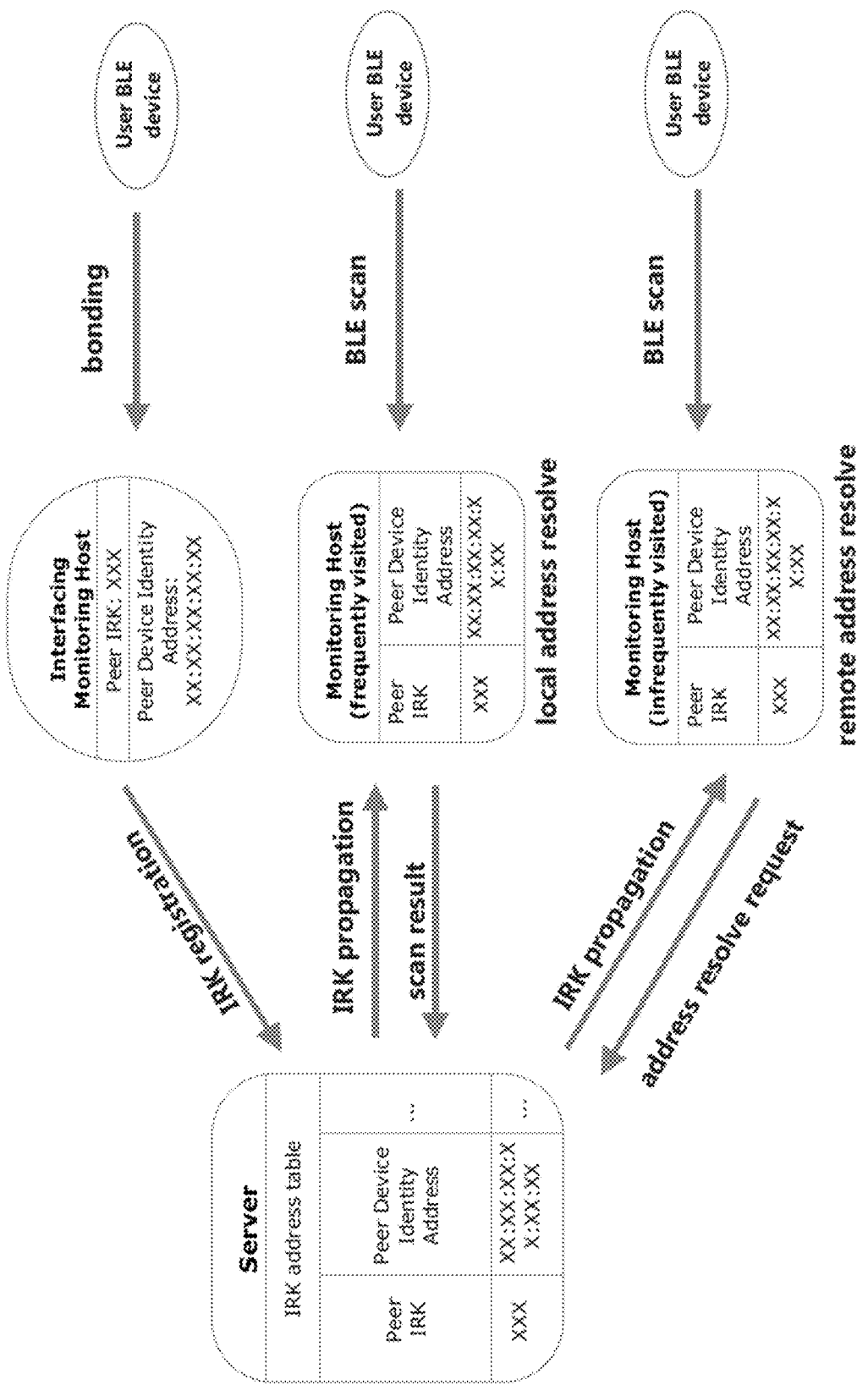
FIG. 6 illustrates one example of a data flow of bonding, registration and propagation for illustrating implementation of BLE Privacy over a large population.

According to BLE privacy, for each pair of BLE devices, a bonding procedure is needed to exchange their IRKs through which they can resolve private addresses in the future. However, this process could be tedious in a monitoring system of thousands of users and hundreds of monitoring hosts—their combinations could easily reach millions. One key feature of the monitoring system is that the system only needs one-way privacy—user BLE devices do not need to store the IRKs of all monitoring hosts as the latter do not need the privacy feature. As such, the Inventors propose a "bond-once, scan everywhere" paradigm in which a user BLE device only needs to bond with a single interfacing host, which then registers this device to the server and propagates it to all monitoring hosts. FIG. 6 illustrates the data flow of bonding, registration and propagation.

The second challenge introduced by large population is the IRK storage and resolving overhead in the monitoring host. Recall that in the BLE privacy specification, a monitoring host must store the IRKs of all peer devices in either the controller or the monitoring host (available after BLE Privacy 1.2). Furthermore, a private address from any of these devices is resolved only by iterating the entire peer IRK list. It imposes a high resource requirement for the monitoring host. To address this problem, the Inventors propose a technique called "remote address resolving" (RAR). Our key observation is that a user tends to stay at a given location over a given period, for example, a staff staying in his/her designating office during working hours. As such, we can allocate the limited IRK storage at the monitoring host to those frequently visiting users. As for those infrequently visiting users, while unrecognized by the monitoring host, the monitoring host can delegate the address resolving task to the server, which possesses all IRKs and have sufficient computational power to iterate the entire peer IRK list. FIG. 6 also illustrates both local and remote address resolving arrangements in the monitoring system.

C.3 Opt-In and Opt-Out Support

As mentioned above, the feature of opt-in and opt-out allows a user to specify the time that he/she desires to "opt-in" or "opt-out" for tracking. The BLE privacy does not support this feature—once a monitoring host obtains the IRK through bonding, it can always resolve the random address produced by the peripheral device.

Figure 7:
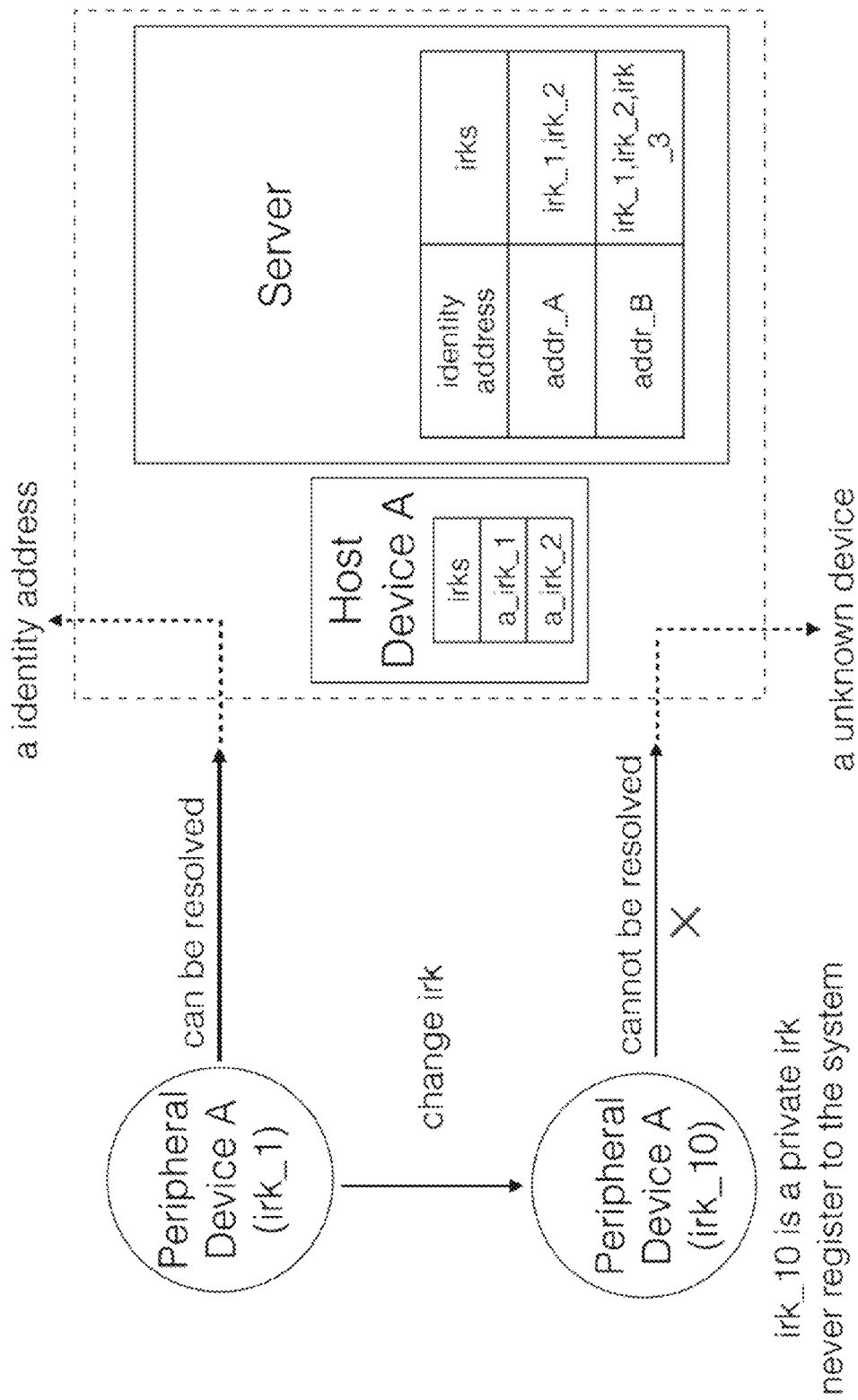
FIG. 7 shows an example of opt-in and opt-out for illustration.

To support this feature, the Inventors propose to use "dual" IRKs for BLE device bonding and registration. Specifically, the system is equipped with two interfacing hosts and each BLE device of a user needs to bond to both. While one (genuine) host retrieves the device's IRK and sends it to the server, the other (phantom) host retrieves the device's second IRK and simply discards it. As such, when the user wants to opt-out for tracking, he/she can configure the BLE device to broadcast with the second IRK, by instructing the device to connect to the phantom host instead of the genuine host. Note that this approach effectively requires a peripheral device to have multiple IRKs, each corresponding to one bonded host device. This arrangement of bonding to more than one host device is not explicitly forbidden in the BLE specification. FIG. 7 shows an example of opt-in/out. Initially, Peripheral Device A can be recognized by the system. Once its IRK is changed to irk_10, a private IRK never registered to the system, Peripheral Device A becomes anonymous and unknown to the system.

C.4 k-Anonymity Metric Support

Figure 8:
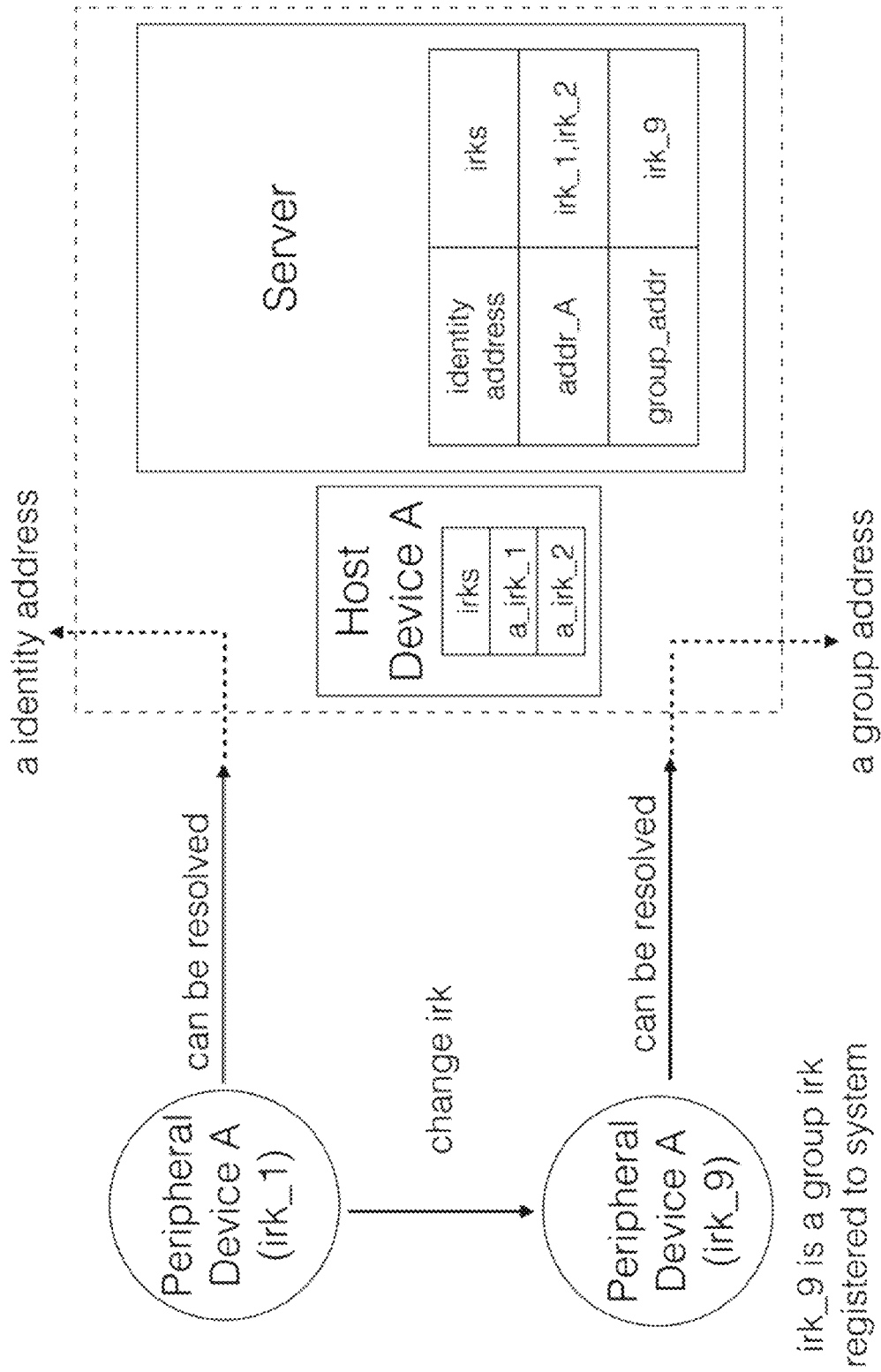
FIG. 8 shows an example of k-anonymity metric support.

As mentioned above, the feature of k-anonymity allows a group of k users to be indistinguishable by each monitoring host. The current privacy feature of BLE does not support this feature as each IRK uniquely identifies a user. To support this feature, the Inventors propose to use "IRK sharing"—a group of k users sharing the same IRK when they are bonded with the interfacing monitoring host. This arrangement can be achieved by using a coordinated IRK generation protocol among the group of users where the protocol enforces the same IRK for these users. For example, in FIG. 8, Peripheral Device A can be recognized by the system when using irk_1. After the device owner changes the IRK to irk_9, a group shared IRK, the address of the device can still be resolved by the system, but only at the group level. In other words, the system only knows that one of the group members appears around Host Device A.

C.5 Granularity Metric Support

As mentioned above, the feature of granularity metric supports allows a user to disclose his/her location up to a certain granularity level. The current privacy feature of BLE does not support this feature as all monitoring hosts share the same sets of IRKs from peripheral devices.

To support this feature, the Inventors propose the technique of "threshold IRK". Specifically, each entry in the server's peer IRK list is augmented with a granularity level threshold when the user registers the BLE device. An IRK is invisible to monitoring hosts whose corresponding location area's granularity levels are below this threshold, and therefore unable to resolve the random address of the peripheral device. If a monitoring host (i.e. an exit) corresponds to multiple location areas, its granularity level is set to that of the lowest location area in the hierarchy.

Figure 9:
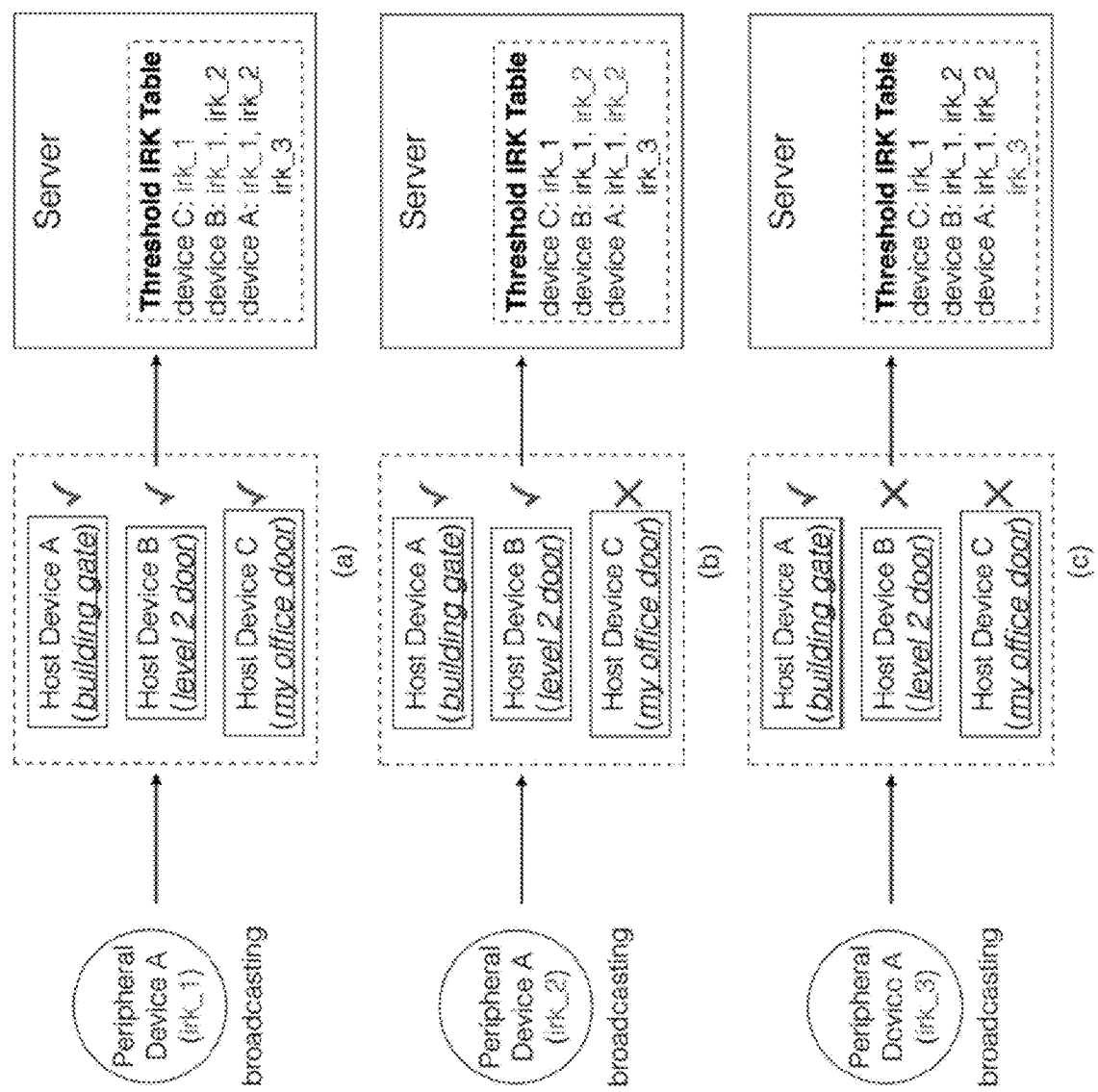
FIG. 9 shows an example of granularity metric.

FIG. 9 illustrates an example of granularity metric. Assume that three hosts A, B, and C are deployed at a building gate, level 2's door, and an office door, respectively. Note that there is a "Threshold IRK Table" at the server side. The table stores the hosts, their corresponding granularity level, and associated IRKs. FIG. 9(*a*) is the initial status of Peripheral Device A. Since irk_1 is visible to all the three host devices, the peripheral device can be monitored when the user appears nearby any one of the host devices. However, if the client (i.e. the peripheral device) changes its IRK to irk_2 as shown in FIG. 9(*b*), Host C cannot identify the client because of the granularity level is too low to access irk_2. In FIG. 9(*c*), the client is even invisible to Host B after the user updates IRK to irk_3.

C.6 Further Enhancement

As discussed in Section A.1, the security of the system relies on the trusted central server, which not only keeps track of all users' privacy parameters including the users' sets of IRKs, but also serves as a goal keeper that guards against malicious monitoring hosts from accessing IRKs of users without authorization. In this sense, the security of the system, as well as location privacy of the users, can be guaranteed as long as all parties follow the protocols in each BLE profile.

However, the problem is more challenging if the central server cannot be trusted or might be compromised due to programming bugs, malicious hacking, etc. In this case, the central server becomes the single point of weakness as it has the exact information of which device is approaching which monitoring host. To address this problem, the Inventors propose a Resolution Shuffling Protocol (RSP) for the monitoring hosts to disguise from the central server the true scanning results of peripheral devices. Note that this protocol still assumes that the server and monitoring hosts are non-colluding. The following list the RSP procedures:

1) Resolution Exchange. Two monitoring hosts both of which have an IRK resolution request to the central server can exchange their requests. Note that for granularity-based privacy, the two hosts must be at the same granularity level in order for the address to be resolved.
2) Resolution Batch Shuffling. For a single monitoring host, it accumulates a batch of resolution requests and shuffles their order before sending the batch to the central server. As such, the server does not know the timestamp that the peripheral device was scanned by this host.
3) Dummy Requests. Following the sending of the batch to the central server, the monitoring host also generates some dummy requests that piggyback on the batch of requests to the central server. These dummy requests are generated by some known IRKs stored at the host.

Note that the above-described RSP protocol incurs some communication overhead as well as delay. As such, heavy use of this protocol, although increasing the disguise power against the server, might not be desirable for a practical location monitoring system.

D. "Track Me Profile" (TMP)

In this section, we introduce the "Track Me Profile" and its services for hosts and peripheral devices.

D.1 A Generic Privacy Profile Extending BLE Privacy Feature

In this section, the Inventors propose a new Bluetooth profile that extends the basic BLE privacy feature. Note that at the time of filing the present application, this is still a relatively new feature in BLE and not many BLE-compatible hardware devices support this feature yet. The purpose of this new profile is not to replace the BLE privacy, but to provide a richer set of privacy semantics for BLE inter-device communications.

As a common profile, the aforesaid new profile is composed of a host device and a peripheral device—the host can resolve the random address of the peripheral device only when the latter enables resolvable random address and has been bonded with the host. The main service provided in this new profile is the management interface for configuring the IRK and the address changing interval (see Table I). Specifically, the profile allows users to store $2^{16}$ sets of IRKs and switch among these sets by editing the priority byte or the first 15 digits of IRK. Table I below summarizes the complete four characteristics in this profile.

TABLE I

Characteristics of BLE privacy profile

| Characteristics | Length | Permission | Function |
|---|---|---|---|
| 0xX001 | 2 bytes | read&write | Changing interval (seconds) of Random Address |
| 0xX002 | 15 bytes | write | The first 15 digits of IRK |
| 0xX003 | 1 byte | read&write | The last digit of IRK also represent the priority |
| 0xX004 | 1 bit | notify | Notify user when address changed |

The privacy features embedded in this profile are as follows. The first characteristic is a 2-byte value, which is used to control the interval (in seconds) of random address changing. Characteristic "0xX002" represents the first 15 digits of the IRK and "0xX003" is the last digit of the IRK also representing the priority. A user can quickly switch the IRK thereof by changing the priority byte. The last characteristic is a notification to notify the user when the address is changed. While a peripheral device can change both its IRK and the Random address whenever necessary, a host only knows the IRK disclosed by a peripheral device while bonding. Such feature is very convenient in privacy-preserving location monitoring when the host can only track a peripheral device when the latter permits.

D.2 Roles and Requirement

"Track Me Profile" extends the basic BLE privacy, and it defines two roles: Target and Host. The Target denotes a wearable device to be tracked, such as a watch, a cellular phone or a key fob. The Host denotes a tracking device that collects location information of the Target from time to time.

Figure 11:
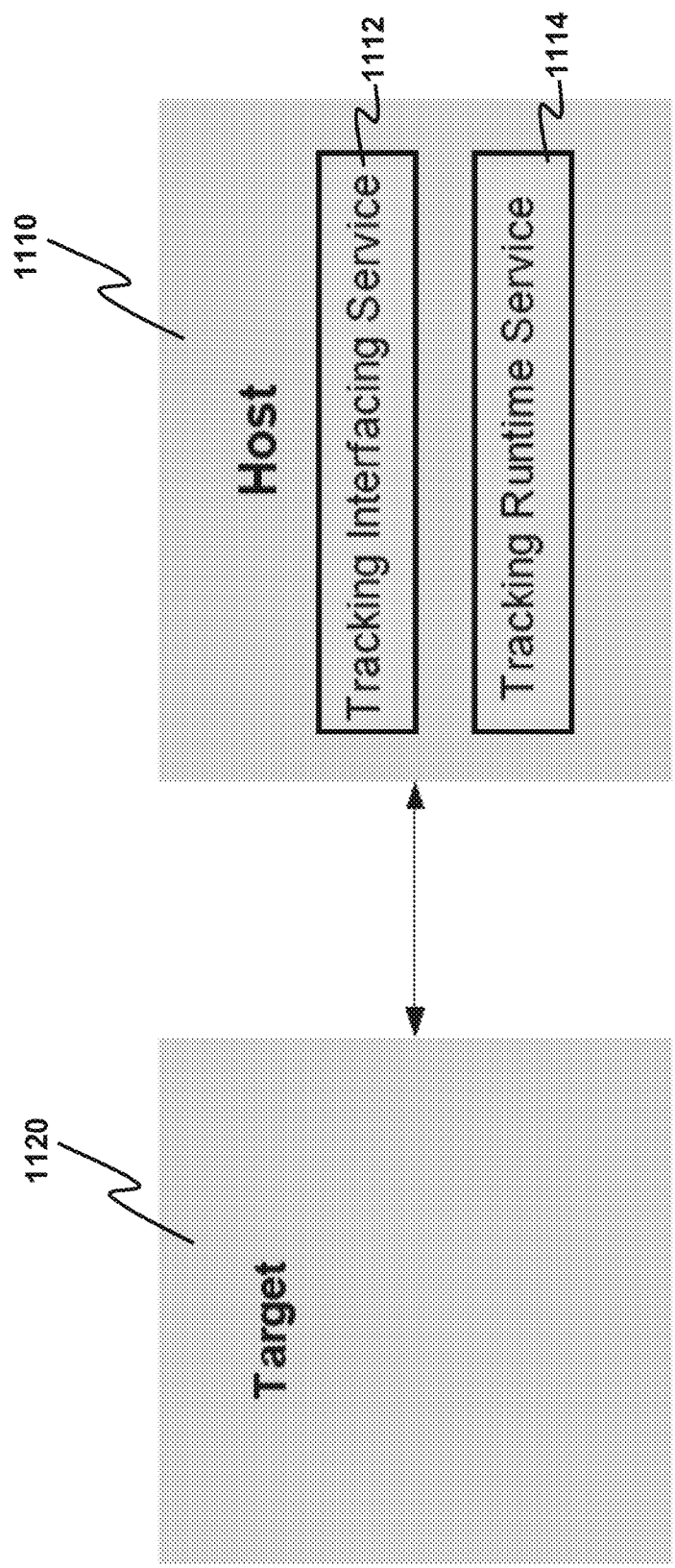
FIG. 11 depicts the roles of Target and Host in Track Me Profile.

FIG. 11 shows the relationships between different services and the two profile roles. The Host 1110 should have one of two available services: Tracking Interfacing Service 1112 or Tracking Runtime Service 1114. The Target 1120 does not need to have any service, but it needs to support both of the services 1112, 1114. That is, besides the conventional procedure of service discovery and characteristic discovery, the Target 1120 should be able to:

1) register itself to the system through Tracking Interfacing Service 1112; and.
2) dynamically change its tracking preference through Tracking Runtime Service 1114.

D.3 Tracking Interfacing Service

This service comprises a set of characteristics that are used for device registration/bonding. These characteristics can be read and written without requiring a response from the server. This service shall be instantiated as a <<PrimaryService>>, and its service UUID shall be set to <<TrackingInterfacing>>. Table II below summarizes the service characteristics with their properties, where M denotes "mandatory" and X denotes "excluded" (i.e. not permitted).

TABLE II

Characteristics of Tracking Interfacing Service

| | Broadcast | Read | Write w/o Response | Write | Indicate | Notify |
|---|---|---|---|---|---|---|
| Privacy Option | X | M | M | X | X | X |

TABLE II-continued

Characteristics of Tracking Interfacing Service

| | Broadcast | Read | Write w/o Response | Write | Indicate | Notify |
|---|---|---|---|---|---|---|
| k-Value | X | M | M | X | X | X |
| Granularity Level | X | M | M | X | X | X |

D.4 Tracking Runtime Service

This service comprises a set of characteristics that are used for device runtime tuning of tracking parameters. These characteristics can be read and written without requiring a response from the server. This service shall be instantiated as a <<PrimaryService>>, and its service UUID shall be set to <<TrackingRuntime>>. Table III below summarizes the service characteristics with their properties.

TABLE III

Characteristics of Tracking Runtime Service

| | Broadcast | Read | Write w/o Response | Write | Indicate | Notify |
|---|---|---|---|---|---|---|
| Opt-In Out | X | M | M | X | X | X |

E. The Present Invention

The present invention is developed according to the embodiments disclosed above. Although the embodiments are predominantly based on an example application of the invention to a scenario of using BLE-enabled communication devices as peripheral devices, the present invention is not limited only to applications for BLE or Bluetooth. The present invention is applicable to a general scenario of using any wireless communication devices as peripheral devices as long as such wireless communication devices are able to send out advertising signals for supporting location monitoring.

An aspect of the present invention is to provide a method for monitoring locations of a plurality of peripheral devices by a location-monitoring system. An individual peripheral device is configured to broadcast an advertising signal containing a broadcasting address indicative to an identity resolving key (also abbreviated as IRK). The IRK, used for device identity and privacy, is a key agreed between the individual peripheral device and a monitoring host and represents a status of the individual peripheral device. The system comprises a plurality of monitoring hosts and a server communicable with the monitoring hosts. Each of the monitoring hosts is configured to scan the advertising signal broadcast from the individual peripheral device. The method is particularly advantageous when the number of the peripheral devices is huge. Another important advantage of the method is that it provides user-selectable privacy-preserving options.

Exemplarily, the method includes a similar feature of a "bond-once, scan everywhere" paradigm. In the method, an interfacing host is selected from the monitoring hosts. Usually, the interfacing host is a pre-determined one assigned by the system. When the individual peripheral device registers itself to the system, a bond between the individual peripheral device and the interfacing host is set up. Generally, the bond is initiated according to a pre-defined protocol agreed by the peripheral devices and the system (such as the BLE specification). In setting up the bond, the interfacing host retrieves, from the individual peripheral device, one or more pre-selected IRKs of the individual peripheral device. (The one or more pre-selected IRKs are selected by the individual peripheral device before or when bonding to the interfacing host.) The interfacing host then sends the one or more pre-selected IRKs to the server. As a result, the one or more pre-selected IRKs of the individual peripheral device are registered to the server. Note that the one or more pre-selected IRKs are associated with a user identity of the individual peripheral device. The server also propagates the one or more pre-selected IRKs received from the interfacing host to all the monitoring hosts other than the interfacing host.

In one embodiment, the individual peripheral device is bonded to the interfacing host only without bonding to any other of the monitoring hosts. Thereby, the individual peripheral device is not required to bond itself to all of the monitoring hosts. As mentioned above, it is advantageous for large-scale location monitoring.

In another embodiment, the method further includes a similar feature of "opt-in, opt-out." When the individual peripheral device registers itself to the system, apart from setting up the bond between the individual peripheral device and the interfacing host, an additional bond between the individual peripheral device and an additional interfacing host is also set up. The additional interfacing host is selected from the monitoring hosts and is different from the interfacing host. By setting up the bond, the additional interfacing host retrieves an additional pre-selected IRK of the individual peripheral device from the individual peripheral device. Different from the actions taken by the interfacing host, the additional interfacing host discards the additional pre-selected IRK without sending it to the server or retaining it in the additional interfacing host. To realize a function similar to "opt-in, opt-out," the individual peripheral device is configured as follows. When the individual peripheral device allows the location thereof to be detected by the system, the IRK in the advertising signal broadcast by the individual peripheral device is selected from the above-mentioned one or more pre-selected IRKs originally retrieved by the interfacing host. When the individual peripheral device disallows the location thereof to be detected by the system, the IRK in the advertising signal broadcast by the individual peripheral device is the additional pre-selected IRK.

In a further embodiment, the method additionally includes a feature similar to "k-anonymity metric support." In the method, the above-mentioned one or more pre-selected IRKs include a device-specific IRK and a group IRK. The device-specific IRK is uniquely used by the individual peripheral device. The group IRK is shared by a group of peripheral devices including the aforesaid individual peripheral device. Optionally, each of the peripheral devices in the group separately generates the group IRK by a coordinated IRK generation protocol, where this protocol is pre-agreed to be adopted in the system by the group of peripheral devices and preferably also by the system. To realize a function similar to "k-anonymity metric support," the individual peripheral device is configured as follows. When the individual peripheral device allows the location and an identity thereof to be detected by the system, the IRK in the advertising signal broadcast by the individual peripheral device is the device-specific IRK. When the individual peripheral device allows the location thereof to be detected by the system but disallows the identity of the individual peripheral device to be revealed to the system, the IRK in the advertising signal broadcast by the individual peripheral device is the group IRK.

In yet another embodiment, the method further includes a feature similar to "granularity metric support." In the method, an individual monitoring host has a host-specific number equal to a location-area granularity level assigned to a location area where the individual monitoring host resides. Each of the one or more pre-selected IRKs of the individual peripheral device (as registered to the server through bonding to the interfacing host) is associated with a granularity level threshold. Each of the monitoring hosts is configured as follows. When an incoming IRK obtained by the individual monitoring host during the scanning of the advertising signal matches one pre-selected IRK having a first granularity level threshold, and when the host-specific number of the individual monitoring host is below the first granularity level threshold, the individual monitoring host discards the incoming IRK without identifying the location of a particular peripheral device that sent the incoming IRK. It follows that the individual monitoring host also does not send out the incoming IRK to the server for resolving an identity of this particular peripheral device.

Preferably, the method supports a feature similar to RAR. In the method, an individual monitoring host is arranged to store only a subset of IRKs obtained during registering the peripheral devices to the system. In particular, the IRKs in the subset correspond to the peripheral devices that frequently visit the individual monitoring host. When an incoming IRK obtained by the individual monitoring host during the scanning of the advertising signal does not match with any IRK stored in the individual monitoring host, the individual monitoring host forwards the incoming IRK to the server for resolving an identity of a particular peripheral device that sent out the incoming IRK.

It is possible to enhance security against a possibility that the server may not be trustworthy. The above-mentioned feature of the RAR may be refined by including the RSP.

In one option, the "resolution exchange" of the RSP is adopted by the method. The individual monitoring host first sends the incoming IRK to another monitoring host. This another monitoring host then relays the incoming IRK to the server without disclosing to the server that the incoming IRK was obtained by the aforesaid individual monitoring host.

In another option, the "resolution batch shuffling" of the RSP is applied. The individual monitoring host is configured as follows. A plurality of incoming IRKs that require the server to resolve the identities of the peripheral devices sending these incoming IRKs are first accumulated to form a batch. Preferably, the individual monitoring host shuffles the accumulated incoming IRKs in their order before forming the batch. The individual monitoring host then sends the batch to the server instead of individually sending each incoming IRK upon receipt thereof.

In a further option, the approach of "dummy requests" is used. The individual monitoring host generates one or more dummy IRKs and incorporates them into the batch for avoiding the server to have full knowledge on the incoming IRKs obtained by the individual monitoring host.

To those skilled in the art, it is apparent that each embodiment of the method disclosed above is implementable in the location-monitoring system provided that the system incorporates the peripheral devices.

The embodiments disclosed herein may be implemented using general purpose or specialized computing devices, computer processors, or electronic circuitries including but not limited to digital signal processors (DSP), application specific integrated circuits (ASIC), field programmable gate arrays (FPGA), and other programmable logic devices configured or programmed according to the teachings of the present disclosure. Computer instructions or software codes running in the general purpose or specialized computing devices, computer processors, or programmable logic devices can readily be prepared by practitioners skilled in the software or electronic art based on the teachings of the present disclosure.

In some embodiments, the present invention includes computer storage media having computer instructions or software codes stored therein which can be used to program computers or microprocessors to perform any of the processes of the present invention. The storage media can include, but are not limited to, floppy disks, optical discs, Blu-ray Disc, DVD, CD-ROMs, and magneto-optical disks, ROMs, RAMs, flash memory devices, or any type of media or devices suitable for storing instructions, codes, and/or data.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A method for monitoring locations of a plurality of peripheral devices by a location-monitoring system, an individual peripheral device being configured to broadcast an advertising signal containing a broadcasting address indicative to an identity resolving key (IRK) that represents a status of the individual peripheral device, the system comprising a plurality of monitoring hosts and a server communicable with the monitoring hosts, each of the monitoring hosts being configured to scan the advertising signal broadcast from the individual peripheral device, the method comprising:
   when the individual peripheral device registers itself to the system, setting up:
      a bond between the individual peripheral device and an interfacing host selected from the monitoring hosts; and
      an additional bond between the individual peripheral device and an additional interfacing host selected from the monitoring hosts and different from the interfacing host;
   retrieving, by the interfacing host, one or more pre-selected IRKs of the individual peripheral device;
   sending, by the interfacing host, the one or more pre-selected IRKs to the server, so as to register the one or more pre-selected IRKs of the individual peripheral device to the server;
   propagating, by the server, the one or more pre-selected IRKs received from the interfacing host to all the monitoring hosts other than the interfacing host;
   retrieving, by the additional interfacing host, an additional pre-selected IRK of the individual peripheral device;
   discarding, by the additional interfacing host, the additional pre-selected IRK without sending to the server, so as not to register the additional pre-selected IRK to the server; and
   configuring the individual peripheral device such that:
      when the individual peripheral device allows the location thereof to be detected by the system, the IRK corresponding to the broadcasting address in the advertising signal broadcast by the individual peripheral device is selected from the one or more pre-selected IRKs, whereby registration of the one or more pre-selected IRKs to the server enables the system to track the location of the individual peripheral device; and
      when the individual peripheral device disallows the location thereof to be detected by the system, the IRK corresponding to the broadcasting address in the advertising signal broadcast by the individual peripheral device is the additional pre-selected IRK, whereby an absence of registration of the additional pre-selected IRK to the server does not enable the system to track the location of the individual peripheral device.

2. The method of claim 1, wherein:
   the one or more pre-selected IRKs include a device-specific IRK and a group IRK, the device-specific IRK being uniquely used by the individual peripheral device, the group IRK being shared by a group of peripheral devices including the aforesaid individual peripheral device; and
   the method further comprises configuring the individual peripheral device such that:
      when the individual peripheral device allows the location and an identity thereof to be detected by the system, the IRK in the advertising signal broadcast by the individual peripheral device is the device-specific IRK, whereby in detecting the location of the individual peripheral device, the device-specific IRK being uniquely used by the individual peripheral device enables the system to determine the identity of the individual peripheral device as well; and
      when the individual peripheral device allows the location thereof to be detected by the system but disallows the identity of the individual peripheral device to be revealed to the system, the IRK in the advertising signal broadcast by the individual peripheral device is the group IRK, whereby in detecting the location of the individual peripheral device, the group IRK being shared by the group of peripheral devices prevents the system to uniquely determine the identity of the individual peripheral device.

3. The method of claim 1, further comprising:
   providing a host-specific number to each of the monitoring hosts, wherein the host-specific number of an individual monitoring host is equal to a location-area granularity level assigned to a location area where the individual monitoring host resides;
   providing one or more pre-selected IRKs to the individual peripheral device, wherein each pre-selected IRK of the individual peripheral device is associated with a granularity level threshold; and
   configuring the individual monitoring host such that when an incoming IRK identified by the individual monitoring host during the scanning of the advertising signal matches a certain pre-selected IRK, the individual monitoring host:

if the host-specific number of the individual monitoring host is below the granularity level threshold associated with said certain pre-selected IRK, discards the incoming IRK without identifying the location of a particular peripheral device that sent this incoming IRK; and otherwise, identifies the location of the particular peripheral device according to the incoming IRK.

4. The method of claim 1, further comprising:

arranging an individual monitoring host to store only a subset of IRKs obtained during registering the peripheral devices to the system, wherein the IRKs in the subset correspond to the peripheral devices that frequently visit the individual monitoring host; and when an incoming IRK identified by the individual monitoring host during the scanning of the advertising signal does not match with any IRK stored in the individual monitoring host, forwarding, by the individual monitoring host, the incoming IRK to the server for resolving an identity of a particular peripheral device that sent out the incoming IRK.

5. The method of claim 4, wherein the forwarding of the incoming IRK to the server comprises:

sending, by the individual monitoring host, the incoming IRK to another monitoring host; and relaying, by said another monitoring host, the incoming IRK to the server without disclosing to the server that the incoming IRK was obtained by the individual monitoring host.

6. The method of claim 4, further comprising configuring the individual monitoring host such that:

a plurality of incoming IRKs that require the server to resolve the identities of the peripheral devices sending these incoming IRKs are accumulated to form a batch; and the individual monitoring host sends the batch to the server instead of individually sending each incoming IRK upon receipt thereof.

7. The method of claim 6, further comprising:

further configuring the individual monitoring host to shuffle the accumulated incoming IRKs in their order before forming the batch.

8. The method of claim 6, further comprising:

further incorporating one or more dummy IRKs generated by the individual monitoring host into the batch for avoiding the server to have full knowledge on the incoming IRKs obtained by the individual monitoring host.

9. A location-monitoring system comprising a plurality of monitoring hosts, a server communicable with the monitoring hosts, and a plurality of peripheral devices, wherein:

an individual peripheral device is configured to broadcast an advertising signal containing a broadcasting address indicative to an identity resolving key (IRK) that represents a status of the individual peripheral device;

each of the monitoring hosts is configured to scan the advertising signal broadcast from the individual peripheral device; and the system is configured to execute a process of monitoring locations of the peripheral devices according to the method of claim 1.

10. A location-monitoring system comprising a plurality of monitoring hosts, a server communicable with the monitoring hosts, and a plurality of peripheral devices, wherein:

an individual peripheral device is configured to broadcast an advertising signal containing a broadcasting address indicative to an identity resolving key (IRK) that represents a status of the individual peripheral device;

each of the monitoring hosts is configured to scan the advertising signal broadcast from the individual peripheral device; and the system is configured to execute a process of monitoring locations of the peripheral devices according to the method of claim 3.

11. A location-monitoring system comprising a plurality of monitoring hosts, a server communicable with the monitoring hosts, and a plurality of peripheral devices, wherein:

an individual peripheral device is configured to broadcast an advertising signal containing a broadcasting address indicative to an identity resolving key (IRK) that represents a status of the individual peripheral device;

each of the monitoring hosts is configured to scan the advertising signal broadcast from the individual peripheral device; and the system is configured to execute a process of monitoring locations of the peripheral devices according to the method of claim 4.

12. A location-monitoring system comprising a plurality of monitoring hosts, a server communicable with the monitoring hosts, and a plurality of peripheral devices, wherein:

an individual peripheral device is configured to broadcast an advertising signal containing a broadcasting address indicative to an identity resolving key (IRK) that represents a status of the individual peripheral device;

each of the monitoring hosts is configured to scan the advertising signal broadcast from the individual peripheral device; and the system is configured to execute a process of monitoring locations of the peripheral devices according to the method of claim 5.

13. A location-monitoring system comprising a plurality of monitoring hosts, a server communicable with the monitoring hosts, and a plurality of peripheral devices, wherein:

an individual peripheral device is configured to broadcast an advertising signal containing a broadcasting address indicative to an identity resolving key (IRK) that represents a status of the individual peripheral device;

each of the monitoring hosts is configured to scan the advertising signal broadcast from the individual peripheral device; and the system is configured to execute a process of monitoring locations of the peripheral devices according to the method of claim 6.

14. A method for monitoring locations of a plurality of peripheral devices by a location-monitoring system, an individual peripheral device being configured to broadcast an advertising signal containing a broadcasting address indicative to an identity resolving key (IRK) that represents a status of the individual peripheral device, the system comprising a plurality of monitoring hosts and a server communicable with the monitoring hosts, each of the monitoring hosts being configured to scan the advertising signal broadcast from the individual peripheral device, the method comprising:

when the individual peripheral device registers itself to the system, setting up a bond between the individual peripheral device and an interfacing host selected from the monitoring hosts;

retrieving, by the interfacing host, one or more pre-selected IRKs of the individual peripheral device, wherein the one or more pre-selected IRKs include a device-specific IRK and a group IRK, the device-specific IRK being uniquely used by the individual peripheral device, the group IRK being shared by a group of peripheral devices including the aforesaid individual peripheral device;

sending, by the interfacing host, the one or more pre-selected IRKs to the server, so as to register the one or more pre-selected IRKs of the individual peripheral device to the server, whereby registration of the one or more pre-selected IRKs to the server enables the system to track the location of the individual peripheral device;

propagating, by the server, the one or more pre-selected IRKs received from the interfacing host to all the monitoring hosts other than the interfacing host; and configuring the individual peripheral device such that:
    when the individual peripheral device allows the location and an identity thereof to be detected by the system, the IRK corresponding to the broadcasting address in the advertising signal broadcast by the individual peripheral device is the device-specific IRK, whereby in detecting the location of the individual peripheral device, the device-specific IRK being uniquely used by the individual peripheral device enables the system to determine the identity of the individual peripheral device as well; and
    when the individual peripheral device allows the location thereof to be detected by the system but disallows the identity of the individual peripheral device to be revealed to the system, the IRK corresponding to the broadcasting address in the advertising signal broadcast by the individual peripheral device is the group IRK, whereby in detecting the location of the individual peripheral device, the group IRK being shared by the group of peripheral devices prevents the system to uniquely determine the identity of the individual peripheral device.

15. The method of claim 14, further comprising:
generating, separately by each of the peripheral devices in the group, the group IRK by a coordinated IRK generation protocol.

16. The method of claim 14, further comprising:
providing a host-specific number to each of the monitoring hosts, wherein the host-specific number of an individual monitoring host is equal to a location-area granularity level assigned to a location area where the individual monitoring host resides;

providing one or more pre-selected IRKs to the individual peripheral device, wherein each pre-selected IRK of the individual peripheral device is associated with a granularity level threshold; and configuring the individual monitoring host such that when an incoming IRK identified by the individual monitoring host during the scanning of the advertising signal matches a certain pre-selected IRK, the individual monitoring host:
    if the host-specific number of the individual monitoring host is below the granularity level threshold associated with said certain pre-selected IRK, discards the incoming IRK without identifying the location of a particular peripheral device that sent this incoming IRK; and
    otherwise, identifies the location of the particular peripheral device according to the incoming IRK.

17. A location-monitoring system comprising a plurality of monitoring hosts, a server communicable with the monitoring hosts, and a plurality of peripheral devices, wherein:
an individual peripheral device is configured to broadcast an advertising signal containing a broadcasting address indicative to an identity resolving key (IRK) that represents a status of the individual peripheral device;
each of the monitoring hosts is configured to scan the advertising signal broadcast from the individual peripheral device; and
the system is configured to execute a process of monitoring locations of the peripheral devices according to the method of claim 14.

18. A location-monitoring system comprising a plurality of monitoring hosts, a server communicable with the monitoring hosts, and a plurality of peripheral devices, wherein:
an individual peripheral device is configured to broadcast an advertising signal containing a broadcasting address indicative to an identity resolving key (IRK) that represents a status of the individual peripheral device;
each of the monitoring hosts is configured to scan the advertising signal broadcast from the individual peripheral device; and
the system is configured to execute a process of monitoring locations of the peripheral devices according to the method of claim 16.

\* \* \* \* \*